April 2, 1935. T. J. O'NEIL 1,996,435
THERMAL INSULATION
Filed March 5, 1932
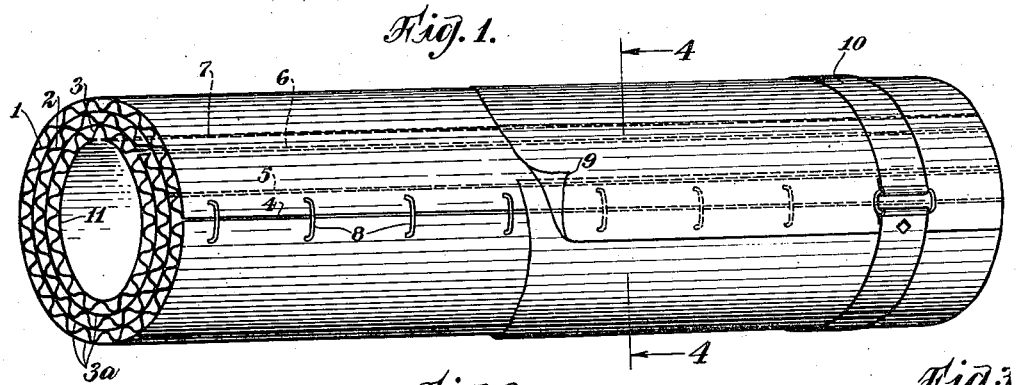
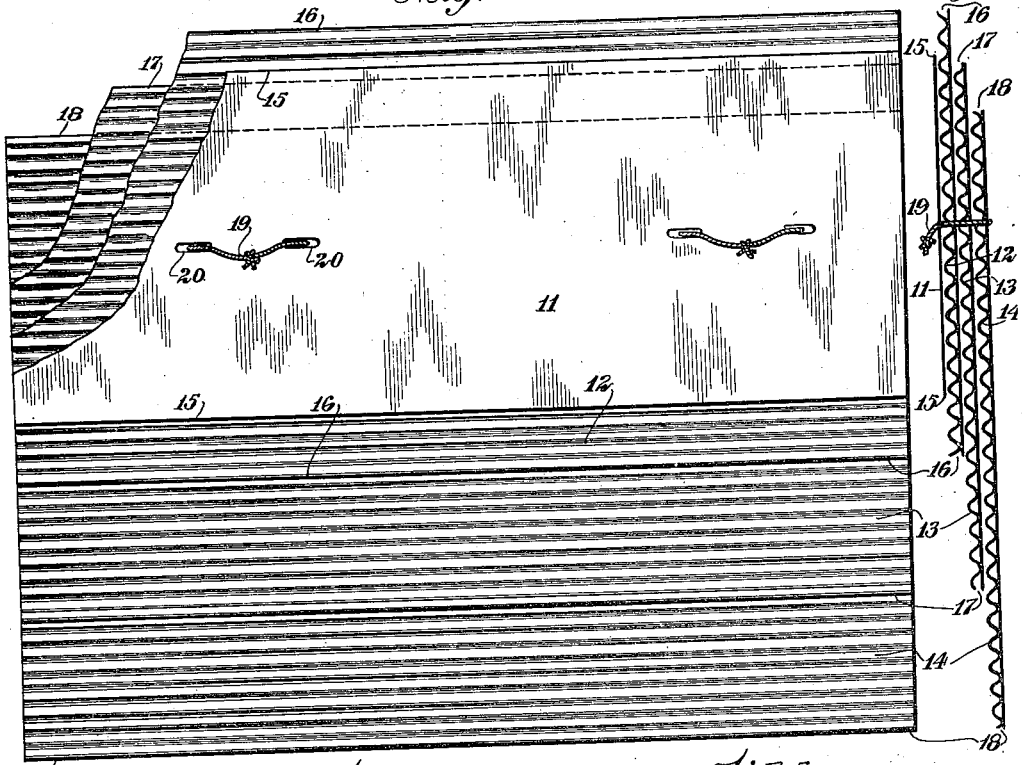
INVENTOR
Thomas J. O'Neil
BY D. V. Halstead
ATTORNEY Patented Apr. 2, 1935

1,996,435

UNITED STATES PATENT OFFICE 1,996,435

THERMAL INSULATION

Thomas J. O'Neil, Boundbrook, N. J., assignor to Johns-Manville Corporation, New York, N. Y., a corporation of New York Application March 5, 1932, Serial No. 596,981

3 Claims. (Cl. 154—45)

This invention relates to thermal insulation and particularly to a flat assembly of discrete layers of insulating material adapted to be shaped around an article to be insulated. The invention pertains also to sectional, tubular thermal insulation resulting from the shaping of a flat assembly around a cylindrical object to be insulated and fastening the shaped assembly in position.

An object of the invention is to provide an economical form of thermal insulation.

Another object is to provide a compact form for the purpose of minimizing the space occupied in a shipping container.

A further object is to provide a form of thermal insulation in the application of which joints may be broken or staggered.

Additional objects and advantages will appear from the detailed description which follows.

An embodiment of the invention is illustrated in the drawing in which

Fig. 1 shows a perspective view of tubular sectional pipe covering assembled in accordance with the invention.

Fig. 2 shows a development of Fig. 1 that consists of a flat assembly of a plurality of layers of insulating material adapted to be shaped into tubular form.

Fig. 3 shows an end view of the development illustrated in Fig. 2.

Fig. 4 shows a cross-section along the lines 4—4 of Fig. 1.

Fig. 5 is a side edge view showing a modified form in which end edges of the various layers are in staggered relationship to each other and adapt sections to be joined in staggered lateral abutment, that is, with discontinuous or broken end joints.

In the various figures like reference characters refer to like parts.

There is illustrated insulation comprising sheets 1, 2 and 3 of corrugated asbestos paper, each backed, i. e., united to a sheet 3a of plain surface asbestos paper, to form a composited layer of thermal insulating material. After being shaped into tubular form, these several composited layers of corrugated and plain paper abut along lines 4, 5 and 6 respectively, to form a broken horizontal joint. The inner lining sheet 11, of plain surface, abuts along line 7. The shaped or tubular pipe covering is fastened, in such manner as to hold the edges of the several layers in abutment, by externally applied fasteners 8, suitably two-pronged members or staples with the prongs inserted through the insulation so that the staple base bridges the joint in the outer layer of the shaped assembly. The whole may then be covered with a canvas jacket 9 and bound with brass hoops 10.

In the flat assembly there is shown the inner lining sheet of plain asbestos paper 11 with side edges 15, the next wider layer 12, of composited corrugated and plain paper, with side edges 16, the next composited layer 13 with side edges 17, and the widest layer 14, also composited, with side edges 18, all being yieldably secured by tied loops of cord or stitches 19 through perforations 20.

Figs. 2 and 3 show that the several layers of asbestos fabric have various widths, increasing with the distance of the layers from one face of the assembly, to adapt each layer to abut at its side edges after shaping of the assembly into tubular form. Figs. 2 and 3 show also a staggered relationship of the side edges of the several layers of the assembly that adapts the several layers, after shaping into tubular form, to abut at their side edges in different zones, to form a discontinuous or broken longitudinal joint, as illustrated in Figs. 1 and 4. Suitably the two sides of a given layer do not project each an equal distance beyond the side edge of an adjacent narrower sheet or layer. In fact, as illustrated in Figs. 2 and 3, the amount by which a wide sheet projects at one side beyond the edge of the adjacent narrow sheet may exceed the total amount by which the wide sheet exceeds the width of the narrow sheet, so that at the other side of the assembly the narrow sheet projects beyond the wider.

A modification of the invention is illustrated in Fig. 5. This sectional side view shows a flat assembly of three layers of composited corrugated and plain asbestos paper and of the inner lining sheet 11, in which assembly the end edges are in staggered relationship. In two sections abutting to give a staggered or broken end joint, the inner lining material 11 has end edges 21, the composited layer 12 has end edges 22, the layer 13 has end edges 23, and the layer 14 has end edges 24. With a plurality of such assemblages, having staggered end edges, which are used in insulating a pipe, the end joint may be staggered or broken, by the abutment of the end edges of the several layers in different zones.

A method of practicing the invention should be evident from the preceding description of the drawing. In making the flat assembly there are first produced the several layers of insulating material, each of the length desired, suitably 3 ft., and each of a width to adapt the several layers of insulating material to have abutting side edges when shaped to the ultimate form. It will be understood that the width of layer required will increase with the distance of that layer from one face of the assembly, that is, from the inside of the ultimate form of insulating article. Thus, the outer layer in a tubular pipe covering must have a greater width originally than the inner.

When the flat assembly of a plurality of layers, suitably two or more of such layers, as for example, 3 to 5, has been made, either with or without the inner lining plain sheet 11, the assembly is united by cementing, stitching, or inserting cord to form a fastening loop. Such uniting of the various members of the assembly should be made in a narrow zone or line approximately parallel to the length of the form into which the assembly is later to be shaped. The union should be yieldable, so that the several layers may slip past one another, except at the zone of union. In fact, the union may be made so loose, as with looped and tied cord, that the various layers may slip on each other even at the place of union.

The thus assembled and united layers are suitably shipped in the flat form to the place of use, there they are shaped around the objects to be insulated, as for example, by bending manually around low pressure steam pipes, the narrower layers being placed adjacent to the pipe and the wider layers farthest away from the pipe in such a manner that the widest layer forms the outside of the shaped insulation. The thus shaped insulation may be stapled, covered with canvas, and banded with brass as illustrated in Fig. 1.

Many variations from the illustrative details given above may be made without departing from the scope of the invention.

Thus the materials from which the insulating materials are composed may be asbestos, wool, wood pulp, cotton fibers, or other insulating material. It will be understood that the kind of material selected will be determined by the conditions, such as temperature, under which the product is to be used.

While the invention has been described particularly as applied to layers of composited plain and corrugated paper, there may be used an assembly of layers or sheets of material of other shapes containing air spaces. There may be used, for example, indented paper. Or the air spaces may be those within porous fabrics.

It will be observed that the assembly of superimposed discrete layers of insulating material yieldably attached to one another is adapted to give satisfactory insulation by being shaped in one thickness around a circular object. The shaped tubular article made from the flat or relatively flat assembly of layers of insulating material will have a wall thickness approximately equal to that of the original flat or relatively flat assembly. This and other features distinguish the invention from the prior art of convoluting a layer of insulating material into an insulating tube, the finished wall of which is as thick as a plurality of the original layers of insulating material.

For shaping the flat assembly around a circular object, the attachment between the several layers in the assembly should be in a single narrow zone. By the phrase "a single narrow zone" is meant a zone no part of which is widely separated laterally from another part. The zone may be up to ½ inch or possibly somewhat wider but should not be nearly as wide, for example, as the layers being united or should not consist of a union at or near both sides of the layers being united.

It will be understood that the features of staggered longitudinal joints and end joints may be combined by first making an assembly of sheets having staggered end and side edges and then making into tubular pipe covering in which both longitudinal and end joints are broken.

The above description and specific examples are to be taken as illustrative only. Any variation or departure therefrom which conforms to the spirit of the invention is intended to be included within the scope of the claims.

What I claim is:

1. A thermal insulating article comprising a flat flexible assembly of superimposed layers of insulating fabric attached to one another in a single relatively narrow zone and adapted to be shaped into the form of a tube length approximately parallel to the relatively narrow zone, the said layers of fabric being of widths increasing with the distance of the layers from one side of the assembly, to adapt the edges of each layer to abut after shaping into tubular form, and the side edges of the several layers being in staggered relationship adapted to cause the abutment of the side edges of the several layers to form a broken longitudinal joint.

2. Sectional tubular insulating pipe covering comprising one thickness of a shaped, originally flat, yieldably united flexible assembly of superimposed layers of corrugated asbestos paper backed with plain surface asbestos paper, the side edges of the several layers abutting in different zones to produce a broken longitudinal joint.

3. Sectional tubular insulating pipe covering comprising one thickness of a shaped, originally flat, yieldably united flexible assembly of superimposed layers of insulating fabric, the side and end edges of the several layers abutting in different zones to produce broken longitudinal and end joints.

THOMAS J. O'NEIL.